United States Patent
Brown et al.

[11] 3,734,823
[45] May 22, 1973

[54] NUCLEAR REACTOR LOOP REACTIVATION SYSTEM

[75] Inventors: William W. Brown, Monroeville; Robert A. Loose, Murrysville; John A. Vogel, Pittsburgh, all of Pa.

[73] Assignee: Westinghouse Electric Corporation, Pittsburgh, Pa.

[22] Filed: Nov. 18, 1969

[21] Appl. No.: 877,644

[52] U.S. Cl. .................. 176/26, 176/24, 176/65
[51] Int. Cl. .......................... G21c 7/32, G21c 17/00
[58] Field of Search .................. 176/19, 24, 26, 87, 176/33, 50, 65, 20

[56] References Cited
UNITED STATES PATENTS

| | | |
|---|---|---|
| 3,128,233 | 4/1964 | Kuerzel .................................. 176/24 |
| 3,211,624 | 10/1965 | Widell ................................... 176/20 |
| 3,212,975 | 10/1965 | Fletcher et al. ........................ 176/20 |
| 3,275,524 | 9/1966 | Williams ................................ 176/20 |
| 3,332,849 | 7/1967 | Kagi ..................................... 176/24 |

*Primary Examiner*—Carl D. Quarforth
*Assistant Examiner*—E. E. Lehmann
*Attorney*—A. T. Stratton, Z. L. Dermer and M. B. L. Hepps

[57] ABSTRACT

A method and means for protecting a nuclear reactor against rapid insertion of reactivity upon the reactivation of an isolated hoop. A temperature interlock, a flow mixing line and a time sequence logic system are coupled to each loop of a nuclear reactor to insure that the temperature and boron concentration of the fluid in each loop are acceptable before such a loop can be recoupled to the reactor coolant system.

2 Claims, 2 Drawing Figures

Patented May 22, 1973    3,734,823

NUCLEAR REACTOR LOOP REACTIVATION SYSTEM

BACKGROUND OF THE INVENTION

This invention relates to nuclear reactor coolant system safety methods and apparatus, and more particularly to a system for assuring proper coolant chemistry and temperature before an isolated loop can be reactivated.

Heretofore, only a temperature interlock mechanically prevented the reactivation of an isolated loop. More particularly the reactor coolant pump on an isolated loop could not be started with both loop isolation valves open until a temperature sensor indicated that the temperature of the isolated loop was approximately that of the operating loops. It was also required that an administrative check be made of the boron chemistry before the isolation valves were opened. However, it is possible to open the valves without realizing that the boron check had been omitted. The result of such an error would be a rapid increase in nuclear activity due to water having a low boron concentration being inserted into the nuclear core.

SUMMARY OF THE INVENTION

The possibility of a rapid increase in nuclear activity due to the insertion of relatively cold or relatively low boron concentration fluid is prevented in accordance with this invention. A temperature interlock system, a flow mixing line and a time sequence logic system are coupled to each loop of a nuclear plant to prevent insertion of the fluid from such a loop until it has been sufficiently mixed with the contents of the reactor and the remaining loops. Thus, it is assured that the boron chemistry and the temperature are acceptable.

Briefly, each reactor coolant loop has a hot leg valve and a cold leg valve. A bypass line is also connected between the hot leg and the cold leg so that the pump associated with each loop can be started with both isolation valves closed. The system also includes a mini-flow line which acts as a bypass on the cold leg valve and allows the fluid from an isolated loop to mix very slowly with the remaining fluid in the reactor system. The interlock logic is such that the hot leg valve cannot be opened unless the cold leg valve is closed and that the pump cannot be started unless both isolation valves are opened or the bypass line is in condition to allow a minimum flow through the pump. Most importantly, the cold leg valve cannot be opened until the temperature in the isolated loop is such as to not insert undue reactivity into the reactor and unless the hot leg valve has also been opened and unless a flow has existed through the mini-flow line for such a predetermined period as to assure that the chemistry of the isolated loop will not appreciably change the chemistry of the core upon insertion of the fluid therefrom.

The system accordingly provides an electromechanical interlock logic system which assures that both the temperature and chemistry of the water entering the reactor core from an isolated loop is such as not to appreciably change the reactivity within the core.

DESCRIPTION OF THE DRAWINGS

For a better understanding of the invention reference may be had to the accompanying drawings, in which.

DESCRIPTION OF THE PREFERRED EMBODIMENT

Figure 1:
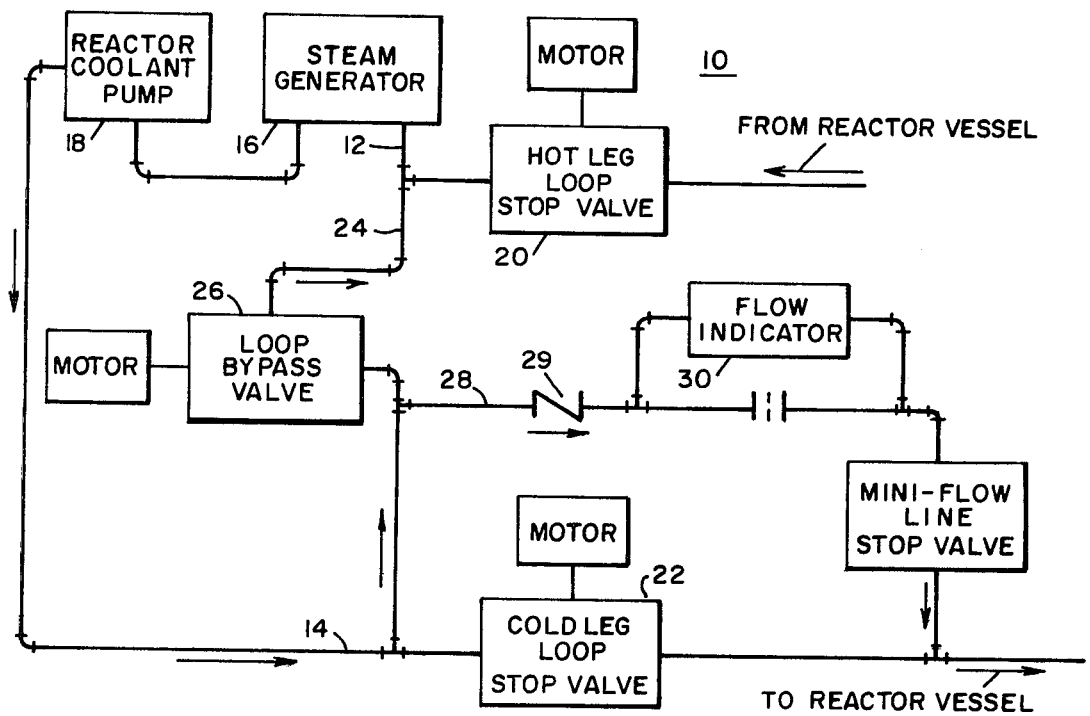
FIG. 1 shows a view of one loop of a reactor coolant system.

Referring now to FIG. 1, there is shown one loop designated by the numeral 10 of a plurality of loops associated with a nuclear steam generating plant. As can be seen, the loop 10 includes a hot leg conduit 12, a cold leg conduit 14, a steam generator 16 and a reactor coolant pump 18.

It is sometimes necessary or desirable to isolate one of the loops of the reactor coolant system from the remainder of the coolant system so as to effectuate repairs and for other purposes. In order to accomplish this, it is normal practice to include a hot leg isolation valve 20 and a cold leg isolation valve 22 with each reactor coolant loop. A bypass line 24 may be connected to the hot leg conduit 12 downstream of the isolation valve 20 and to the cold leg conduit 14 upstream of the isolation valve 22. The bypass line 24 enables the plant operator to start the reactor coolant pump 18 with either or both of the isolation valves 20 and 22 in the closed position. The bypass line 24 also desirably includes a valve 26 which can be closed to prohibit bypass flow during normal operation of the loop 10.

As previously mentioned, a good deal of caution must be exercised when reactivating or reconnecting an isolated loop to the reactor coolant system. If the temperature of the fluid within the previously isolated loop is lower than that within the reactor vessel, the insertion of this cold fluid will in a thermal reactor thermalize a greater number of neutrons and cause the reactivity of the core to rapidly increase. Also, if the boron concentration of the fluid in the previously deactivated loop is lower than that within the core, the insertion of the fluid having a low boron concentration will act to increase reactivity. The combination of relatively cold and low boron concentration fluid being inserted into a reactor core can be a dangerous circumstance. In order to prohibit such an occurrence and in accordance with this invention, a mini-flow line 28 is connected from the bypass line 24 to the cold leg conduit downstream of the isolation valve 22. The purpose of the mini-flow line 28 is to allow the fluid in the isolated loop to slowly mix with the fluid in the reactor vessel with the isolation valve 22 closed. A valve 29 is included on the line 28. One or more temperature sensors (not shown) can also be affixed to the various loops. A flow indication device 30 is also preferably affixed to the mini-flow line 28.

Figure 2:
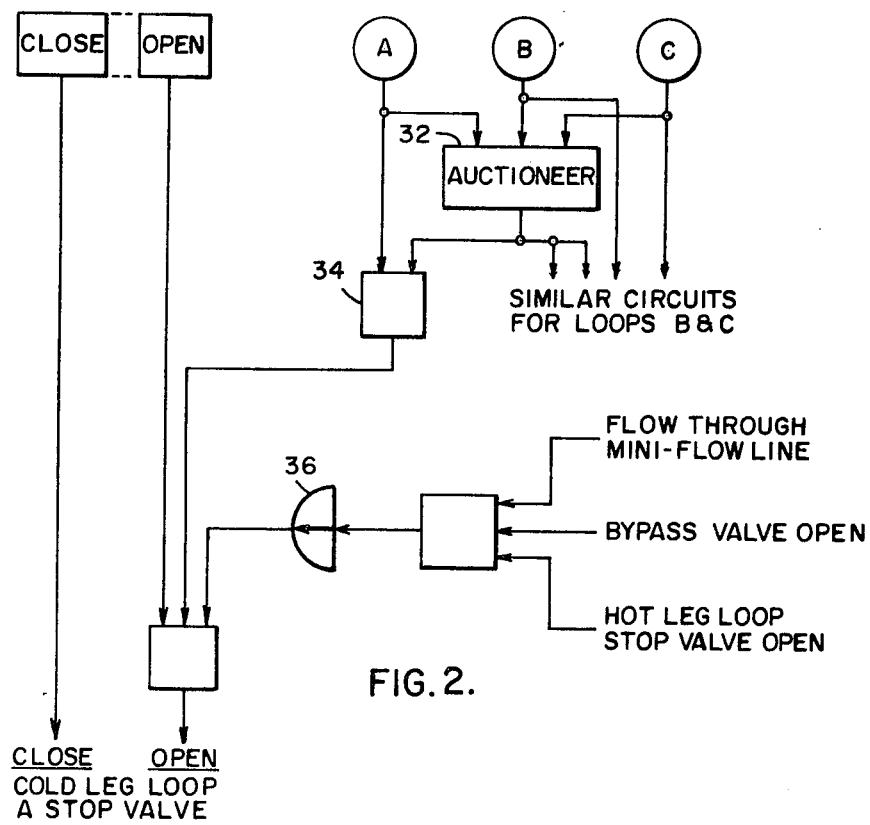
FIG. 2 shows schematically the cold leg loop stop valve interlock logic scheme.

Referring now to FIG. 2 wherein the operational logic for the coolant loop of FIG. 1 is shown, the temperature from three loops designated A, B and C are fed to an auctioneer 32. In the example, it is assumed that loop A has been isolated for example for repairs and that it is now desired that it be reconnected to the reactor coolant system. The auctioneer is a well known piece of electrical apparatus which merely functions to choose the highest of the three temperatures sensed in loops A, B and C. This temperature signal is then sent to a comparison device 34 also a well known electrical structure, which in this example compares the temperature in loop A with the temperature of the higher of loops B and C. The comparison device may be set for any temperature difference, for example it may be set for a T of 20°, that is, if loop A is 20° colder than the higher of loops B and C, the signal to open cold leg isolation valve 22 cannot be sent. At the same time by way of example, three signals may be used to actuate a timer 36, that is, flow sensed by flow indidactor 30, a signal indicating that bypass valve 26 is open and a signal indicating hot leg isolation valve 20 is open. The timer 36 may be set for any length of time. By way of example, it will be assumed that it has been set for an hour. At the end of an hour an interlock on cold leg isolation valve 22 is released so that valve 22 may then be opened. The various interlocks may simply be switches which remain open unless a predetermined event has occurred; as is well known in the electrical arts. As may be seen, in order for loop 10 to be reactivated, loop 10 designated A in the schematic diagram of FIG. 2 must contain fluid of a temperature no less than 20° less than that of the higher of the other loops. At the same time, flow must have existed through the mini-flow line for one hour, the bypass valve 26 must have been open and the hot leg isolation valve 20 must be open. This of course will insure that the fluid in the isolated loop 10 has been well mixed with that in the remainder of the reactor coolant system and that the temperature is within the desirable range.

As will be understood by worker's in the art, devices other than a timer can be utilized to assure proper mixture of the fluid in the isolated loop with the remainder of the fluid in the nuclear reactor system. As for example, the device 30 which has been called a flow indicator might be a flow integrator which could be utilized to ascertain the total amount of flow passing through the mini-flow line 28 and might be alone utilized to release the interlock on isolation valve 22 when sufficient flow has passed. Likewise, the logic utilized and exemplified in FIG. 2 could obviously be simplified so as to rely merely on a sufficient amount of flow mixing through mini-flow line 30.

There is also preferably an interlock on hot leg isolation valve 20 such that valve 20 cannot be opened unless cold leg isolation valve 22 is closed. This also acts to prevent reactivation of the isolated loop through error.

As will be understood, many modifications of the existing scheme can be made within the contemplation of this invention. What is essential is that an interlock system be provided such that a substantial amount of mixing of the fluid in an isolated loop must have occurred before the cold leg isolation valve is opened. Accordingly, the invention should not be viewed as limited by this specific embodiment shown only for illustrative purposes, but is rather encompassed in the appended claims.

We claim as our invention:

1. A nuclear reactor loop reactivation system comprising:
   a fluid moderated and cooled nuclear reactor;
   at least one fluid circulation loop connected to said nuclear reactor for removing the heat generated therein, and means for causing circulation of the fluid through said loop;
   at least one isolation valve situated within said loop for isolating same when required;
   a conduit of a smaller diameter than said loop coupled to said loop so as to bypass said valve whereby mixing of the fluid in an isolated loop may be accomplished with the isolation valve closed;
   a valve in said conduit;
   a temperature sensor in said loop electrically coupled to said valve to prevent the valve being opened if the temperature in said loop is below a desired lower limit,
   means coupled to said conduit for ascertaining the existence of flow through the conduit, said means being electrically coupled to said valve so as to prevent the valve being opened until a predetermined amount of fluid from the isolated loop has mixed with the remaining fluid in the reactor system; and
   a timer actuated by said means, said timer being set to allow the opening of the valve after a predetermined time.

2. A nuclear reactor loop reactivation system comprising:
   a fluid moderated and cooled nuclear reactor;
   at least one fluid circulation loop connected to said nuclear reactor for removing the heat generated therein, and means for causing circulation of the fluid through said loop;
   a pair of isolation valves situated within said loop for isolating same when required, a first of said valves prohibiting the entry of fluid into the loop and the second valve prohibiting the exit of fluid from said loop, and a bypass line connected in said loop downstream of said first valve and upstream of said second valve; a valve in said bypass line;
   a conduit of a smaller diameter than said loop connected at one end to said bypass line and at its other end to the downstream side of said second valve so as to bypass said second valve whereby mixing of the fluid in an isolated loop may be accomplished with the second isolation valve closed;
   a temperature sensor situated in said loop and electrically coupled to said second valve so as to prevent the valve being opened if the temperature is below a desired lower limit, and means coupled to said conduit for ascertaining the existence of flow through the conduit, said means being electrically coupled to said second valve so as to prevent the valve being opened until a predetermined amount of fluid from the isolated loop has mixed with the remaining fluid in the reactor system.

* * * * *